UNITED STATES PATENT OFFICE.

ARTHUR ZITSCHER AND ERNST JULIUS RATH, OF OFFENBACH-ON-THE-MAIN, GERMANY, ASSIGNORS TO CORPORATION OF CHEMISCHE FABRIK GRIESHEIM ELEKTRON, OF FRANKFORT-ON-THE-MAIN, GERMANY.

ANTHRACENE DERIVATIVES AND PROCESS OF MAKING SAME.

1,028,521.  Specification of Letters Patent.  Patented June 4, 1912.

No Drawing.   Application filed February 24, 1912.  Serial No. 679,686.

*To all whom it may concern:*

Be it known that we, ARTHUR ZITSCHER and ERNST JULIUS RATH, doctors of philosophy, chemists, and subjects of the German Emperor, and residents of Offenbach-on-the-Main, Grand Duchy of Hesse, Germany, with the post-office address Friedrichstrasse 31 and Kaiserstrasse 115, respectively, have invented new and useful Improvements in Anthracene Derivatives and Processes of Making Same, of which the following is a specification.

Römer has described in the "*Berichte der Deutschen Chemischen Gesellschaft*" vol. 15 page 224 a process for the manufacture of 2-aminoanthracene (called by Liebermann "beta-anthramin" *loc. cit.* page 226) consisting in heating 2-aminoanthraquinone with hydriodic acid and red phosphorus. This process cannot be applied industrially. Römer has also stated that a body can be obtained by action of zinc and caustic potash lye or ammonia upon 2-aminoanthraquinone, which can easily be re-converted into the original compound, that is to say into 2-aminoanthraquinone; this body therefore cannot be beta-anthramin. It thus appears that Römer was unable to make beta-anthramin from 2-aminoanthraquinone by reduction in presence of alkali.

We have found that 2-aminoanthraquinone, those of its derivatives which do not contain sulfo groups, and the products of reduction of these bodies which are soluble in alkali, such as beta-aminoanthranol can be advantageously transformed into beta-anthramin by treatment with zinc in presence of an alkali, the action being continued until substantially none of the product of reduction soluble in alkali remains.

The invention is based on the said discovery and is illustrated by the following examples, the parts being by weight.

Example I: 50 parts of 2-aminoanthraquinone are heated in a reflux apparatus with 500 parts of ammonia solution of specific gravity 0.91 and 100 parts of zinc dust, for 10 hours. There is formed a brown-red solution from which the beta-anthramin is precipitated as canary-yellow crystals, which are filtered and recrystallized from a solvent such as alcohol.

Example II: 50 parts of beta-aminoanthranol are heated in a reflux apparatus with 350 parts of caustic soda lye of 35° Baumé specific gravity, 1000 parts of water and 50 parts of zinc dust until no anthraquinone derivative soluble in alkali remains, for instance for 8 hours. The product is isolated in manner similar to that described in Example I.

Example III: 100 parts of 26-diaminoanthraquinone are heated in a reflux apparatus, with 700 parts of caustic soda lye of 35° Baumé specific gravity, 1500 parts of water and 200 parts of zinc dust for 15 hours. The 2:6-diaminoanthracene thus obtained can be separated from zinc dust by dissolution in alcohol. After recrystallization from xylene the product melts at about 250° C.

In analogous manner other derivatives of 2-aminoanthraquinone, for example halogen-substitution products, are transformed into aminoanthracene or its derivatives, the halogen atoms being completely or partly eliminated. Thus, beta-anthramin can be obtained from 1:3-dibromo-2-amino-anthraquinone. Beta-anthramin and its derivatives are applicable in the manufacture of dye-stuffs.

Now what we claim and desire to secure by Letters Patent is the following:

The process for the manufacture of 2-aminoanthracene derivatives consisting in treating anthraquinone derivatives, which do not contain sulfo groups and at least contain one amino group in the beta position, with zinc in presence of an alkali until the product becomes insoluble in alkali substantially as described.

In testimony, that we claim the foregoing as our invention, we have signed our names in presence of two witnesses, this ninth day of February 1912.

ARTHUR ZITSCHER.
ERNST JULIUS RATH.

Witnesses:
PETER LAUTENSCHLÄGER,
FRITZ DÉSOR.